United States Patent
Puehringer et al.

(10) Patent No.: US 7,907,967 B2
(45) Date of Patent: Mar. 15, 2011

(54) RADIO FREQUENCY MODULE

(75) Inventors: Thomas Puehringer, Pfarrkirchen (AT); Dietmar Wenzel, München (DE); Friedrich Seebacher, Leonding (AT); Burkhard Neurauter, Linz (AT); Rainer Koller, Linz (AT); Christian Duerdodt, Bochum (DE); Hans Margiol, Linz (AT); Markus Schutti, Linz (AT)

(73) Assignee: Infineon Technologies AG, Neubiberg (DE)

( * ) Notice: Subject to any disclaimer, the term of this patent is extended or adjusted under 35 U.S.C. 154(b) by 731 days.

(21) Appl. No.: 11/851,862

(22) Filed: Sep. 7, 2007

(65) Prior Publication Data

US 2009/0068962 A1   Mar. 12, 2009

(51) Int. Cl.
  *H04B 1/38* (2006.01)
(52) U.S. Cl. ........................................ 455/557
(58) Field of Classification Search .................. 455/557, 455/90.1, 90.2, 414.1, 73, 550.1, 414.4, 127.4, 455/160.1
See application file for complete search history.

(56) References Cited

U.S. PATENT DOCUMENTS

2006/0148520 A1\* 7/2006 Baker et al. ................ 455/556.2
2006/0211387 A1\* 9/2006 Pisek et al. .................... 455/130

FOREIGN PATENT DOCUMENTS

DE   102004059393 A1   4/2006

OTHER PUBLICATIONS

DigRF-Dual-Mode 2.5G/3G Basband/RF IC Interface Standard, vol. 3.09, Nov. 22, 2006, p. 1-66.

\* cited by examiner

*Primary Examiner* — Eugene Yun
(74) *Attorney, Agent, or Firm* — Eschweiler & Associates, LLC

(57) ABSTRACT

A description is given of a radio frequency module comprising an interface unit configured to receive macros having a first format from an input of the radio frequency module, a microprocessor coupled to the interface unit and operable to convert the macros having the first format to macros having a second format, a first memory coupled to the microprocessor and operable to store macros having the second format provided by the microprocessor and a first finite state machine implemented in hardware and configured to process macros having the second format accessed from the first memory.

25 Claims, 4 Drawing Sheets

RADIO FREQUENCY MODULE

FIELD OF THE INVENTION

The invention relates to a radio frequency module as it may, for example, be used in a mobile communications system.

BACKGROUND OF THE INVENTION

Mobile communications systems usually comprise an assembly of baseband components and an assembly of radio frequency components. These assemblies may be coupled by an interface unit.

BRIEF DESCRIPTION OF THE DRAWINGS

Aspects of the invention are made more evident by way of example in the following detailed description of embodiments when read in conjunction with the attached figures, wherein.

DETAILED DESCRIPTION OF THE INVENTION

Figure 1:
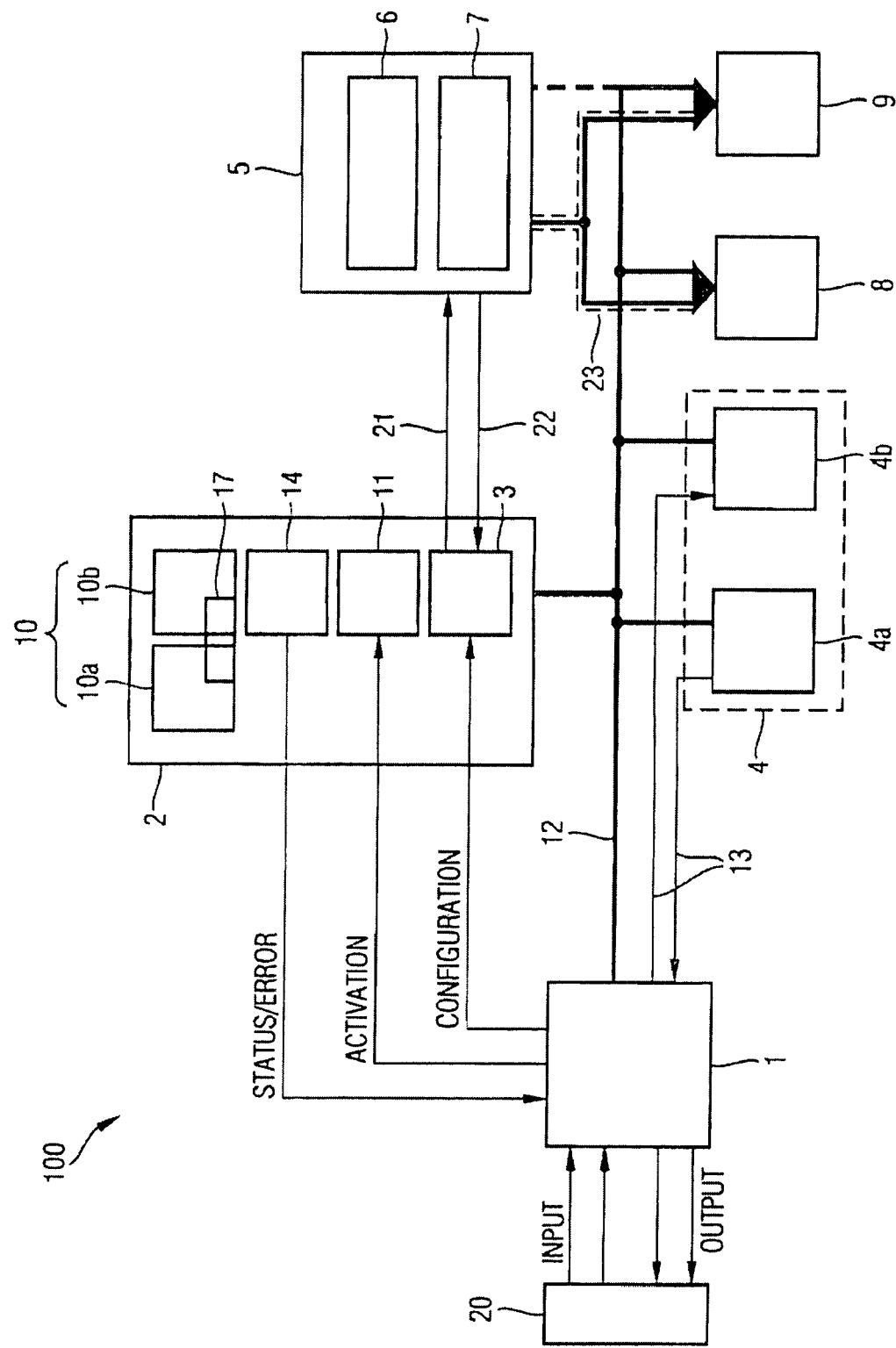
FIG. 1 schematically shows a diagram of a radio frequency module 100 as an exemplary embodiment.

In the following, embodiments are described with reference to the drawings, wherein like reference numerals are generally utilized to refer to like elements throughout. In the following description, for purposes of explanation, numerous specific details are set forth in order to provide a thorough understanding of one or more aspects of embodiments. It may be evident, however, to a person skilled in the art that one or more aspects of the embodiments may be practiced with a lesser degree of these specific details. In other instances, structures and devices are shown in block diagram form in order to facilitate describing one or more aspects of the embodiments. The following description is therefore not to be taken in a limiting sense, and the scope of the application is defined by the appended claims.

In addition, while a particular feature or aspect of an embodiment is disclosed with respect to only one of several implementations, such feature or aspect may be combined with one or more other features or aspects of the other implementations as may be desired and feasible for any given or particular application. Furthermore, to the extent that the terms "include", "have", "with", or other variants thereof are used in either the detailed description or the claims, such terms are intended to be inclusive in a manner similar to the term "comprise". The terms "coupled" and "connected", along with derivatives, are used to indicate that two elements co-operate or interact with each other regardless whether they are in direct physical or electrical contact, or they are not in direct contact with each other.

Radio frequency modules as described below may be used in mobile communications systems, among them CDMA (Code Division Multiple Access) systems like UMTS (Universal Mobile Telecommunications System) or mobile communications systems using other types of multiple access schemes, e.g. GSM (Global System for Mobile Communications)/EDGE (Enhanced Data Rates for GSM Evolution), GPRS (General Packet Radio System) etc.

FIG. 1 schematically shows a diagram of a radio frequency module 100 as an exemplary embodiment. The radio frequency module 100 comprises an interface unit 1 configured to receive macros having a first format from an input of the radio frequency module 100. The macros having the first format are comprised in the overall data received by the radio frequency module 100 and indicated by the two arrows INPUT. The interface unit 1 further sends macros to an output of the radio frequency module 100 indicated by the two arrows OUTPUT. In general, the input and output data is of arbitrary form, but the interface unit 1 may particularly be configured to handle digital date in serial and/or differential form.

The interface unit 1 may be coupled via INPUT/OUTPUT to a module of baseband components, wherein the baseband module (BB) 20 and the radio frequency module 100 may respectively be integrated on separate chips. It this case, both modules comprise separate interface units and may be coupled via these respective interface units. The interface units may, in one embodiment, be implemented by low-swing controlled-impedance differential pairs.

One specific embodiment for an interface standard on which the interface unit 1 may be based on is the DigRF Dual-Mode 2.5G/3G baseband/RF IC Interface Standard, which defines the physical interconnection between baseband and radio frequency modules for digital cellular terminals. The DigRF interface provides logical channels for symbol data, control data, timing information and read back information, but does not provide definitions concerning the functional, syntactic or semantic context between these logical channels. A detailed specification on the DigRF standard is, for example, summarized in the document "DigRF DUAL-MODE 2.5G/3G BASEBAND/RF IC INTERFACE STANDARD" (Nov. 22, 2006; Version: 3.09) by the DigRF Working Group, whose contents are incorporated herein by reference.

The interface unit 1 is coupled to a backbone controller 2 comprising a set of finite state machines implemented in hardware. More specifically, the backbone controller 2 may comprise a first finite stats machine 10 having e.g. two finite state machine units (SM) 10a, 10b, a second finite state machine (SM) 3, a third finite state machine (SM) 11 and a fourth finite state machine (SM) 14. In one embodiment the coupling between the interface unit 1 and the finite stats machines 3, 10, 11, 14 of the backbone controller 2 is established by the channels CONFIGURATION, ACTIVATION and STATUS/ERROR, whose functionality will become clearer in the following paragraphs. It is to be noted that in one embodiment the finite state machines 3, 10, 11, 14 may be interconnected among each other depending on their individual functionalities and their desired interaction. This also means that, a connection between the interface unit 1 and only one specific finite state machine via one specific channel does not necessarily mean that the remaining finite state machines are incapable of accessing (or being accessed by) the information transmitted over this specific channel.

Further, the radio frequency module 100 comprises a microprocessor 5 having a central processing unit (CPU) 6 and an address decoder (ADDR DEC) 7. The second finite state machine 3 is configured to output a start signal fed via line 21 to the microprocessor 5. On the other hand, the microprocessor 5 is operable to generate a ready signal, which is communicated via line 22 to the second finite state machine 3.

Further, the radio frequency module 100 comprises a transceiver unit 4 having a receiving unit (RX) 4a and a transmitting unit (TX) 4b, a first memory 8 that in one embodiment may be implemented as a RAM (Random Access Memory) and a second memory 9 that in one embodiment may be implemented by a ROM (Read Only Memory). A first control bus system 23, indicated by dashed lines, interconnects the microprocessor 5 to the first memory 8 and the second memory 9. Further, a second control bus system 12 interconnects the first memory 8, the second memory 9, the transceiver 4 and the finite state machines 3, 10, 11, 14 contained in the backbone controller 2 to the interface unit 1.

In one embodiment the finite state machines 3, 10, 11, 14 may be implemented by programmable) logic devices, (e.g., programmable) logic controllers, logic gates, flip flops or relays. In particular, the flexibility of the finite state machines 3, 10, 11, 14 is provided by means of programmable registers in one embodiment. The arbitration logic between the finite state machines 3, 10, 11, 14 of the backbone controller 2 may be provided by a scheduling mechanism in one embodiment. In the following, the finite state machines 3, 10, 11, 14 comprised in the backbone controller 2 together with their specific functionalities will be described. It is however understood that the backbone controller 2 (or more general the radio frequency module 100) may comprise further finite state machines depending on the desired overall functionality of the radio frequency module 100.

The interface unit 1 is coupled to the second finite state machine 3 implemented in hardware over the channel CONFIGURATION. The channel CONFIGURATION transmits macros having the first format from the interface unit 1 to the second finite state machine 3. The macros having the first format are configuration macros to configure operations performed by components of the transceiver unit 4 comprising the receiving unit 4a and a transmitting unit 4b. In one embodiment the transceiver units 4a and 4b may be arbitrarily implemented comprising analog and digital standard components. More specifically, in one embodiment the receiving unit 4a may comprise a signal receiving path including a channel filter fed by a receiving antenna, a down-conversion unit configured to down-convert the filtered received signal into an intermediate frequency or into the baseband, an ADC (Analog-to-Digital Converter) and one or more digital filters for filtering the received signal. The transmitting unit 4b, in one embodiment, may comprise a signal path having one or more digital filters for filtering a transmit signal, a DAC (Digital-to-Analog Converter) for converting the digital transmit signal into an analog signal, an up-conversion stage for shifting the analog transmit signal into the radio frequency domain, a channel filter filtering the radio frequency signal, and a power amplifier outputting the amplified signal to a transmit antenna.

In one embodiment the macros having the first format may represent reformation for the communication between the baseband module 20 (in particular a processor comprised, therein) and the radio frequency module 100. For example, they may control the booting sequence of the signal processing paths in the transceiver units 4a, 4b, chip initializations, frequency calibrations or the determination or setting of the coefficients of an FIR (Finite Impulse Response) filter in the signal processing paths in the transceiver units 4a, 4b.

The second, finite state machine 3 is further configured to process the macros having the first format that may vary in their complexity and processing latency. The second finite state machine 3 is configured to decide if the received macros having the first format will be processed by the second finite stair machine 3 or if they are to be forwarded to the microprocessor 5. This decision, depends on the content of an operation node field comprised in the first format. When the second finite state machine 3 receives a macro having the first format, the macro is cheered by reading the content of its operation code field. The following processing steps then decent on the read content.

In one embodiment, configuration macros of low to medium complexity and short processing latencies are directly processed by the second finite state machine 3. Here, a macro of low to medium complexity corresponds to a macro that may directly be processed by the second finite state machine 3 in seen a way that requirements of a real-time mode are satisfied. Since the second finite stats machine 3 is implemented in hardware, it ensures an effective processing with low latencies. Contrarily, macros of high complexity (e.g., lots of arithmetic steps like conversions or interpolations) are forwarded, to the microprocessor 5. To this end, the macro is stored in the first memory 8, and the second finite state machine 3 checks via line 22 whether the microprocessor 5 is busy or not. If the microprocessor is not busy, the finite state machine 3 outputs a start signal via line 21 causing the microprocessor 5 to read the configuration macro from memory 3 and to process it.

The general processing unit 6 of the microprocessor 5 is operable to convert macros having the first format to macros having a second format. The implementation of the central processing unit 6 is arbitrary and depends on the specific implementation of the radio frequency module 100. For example, in one embodiment, the CPU 6 may be realised in form of an 8-bit CISC (Complex Instruction Set Computing) von Neumann architecture. In one embodiment, the address decoder 7 maps address spaces of the central processing unit 6 to the first memory 8 and/or the second memory 9, both coupled, to the microprocessor 5 by the first control bus system 23 indicated by dashed lines.

If macros having the first format are forwarded by the second finite state machine 3, the microprocessor 5 converts these macros to macros of the second format. In one embodiment, the second format comprises a register address field, a data value field and a time value field. The information contained therein suffices to determine a timed register write access and accordingly the second format may, for example, be embodied as a list of serial timed register accesses. More details on the first format, the second format and the conversion process between them according to one embodiment are provided in FIG. 2 and its description.

In one embodiment the converted macros having the second format are stored in the first memory 8 that may be implemented by a RAM (Random Access Memory) and that may additionally be employed as a working memory for the microprocessor 5. The second memory 9, which may be a ROM (Read Only Memory), may serve to contain software or firmware for the microprocessor 5 and/or data for one or more of the finite state machines 3, 10, 11, 14 comprised in the backbone controller 2.

After the conversion by the microprocessor 5, the macros having the second format are processed by the first finite state machine 10a, 10b implemented in hardware that is configured to process macros having the second format. In FIG. 1, the first finite state machine 10a, 10b comprises a first unit 10a configured to process configuration macros that concern tasks performed by the receiving unit 4a and a second unit 10b configured to process macros that concern tasks performed by the transmitting unit 4b. The two units 10a and 10b may be implemented in form of two separate finite state machines, but may also be integrated in only one finite state machine 10. Accordingly, the following description will sometimes refer to the whole first finite state machine 10, as well as to its individual components 10a and 10b. The first finite state machine 10a, 10b may comprise a timer (T) 17 to time the processing of macros having the second format generated by the microprocessor 5. The timing may be controlled and/or determined by the time value field comprised in the second format.

In one embodiment to ensure an accurate and chronological operation of the radio frequency module 100, the processing of the first finite state machine 10a, 10b has to be started at the right time. The correct timing is achieved, by means of activation macros that are configured to activate the processing of configuration macros having the first or the second format. In one embodiment the activation macros may further be used as stand-alone macros for time-critical operations, for example a synchronization between the radio frequency module 100 and the baseband module 20 coupled thereto. In one embodiment, the activation macros show a low level of complexity and short processing latencies to satisfy the requirements of a real-time mode. Examples for the processing of configuration macros, activation macros, as well as their interplay are provided in FIGS. 3 to 5 and their description.

The baseband module 20 may comprise components for processing transmit and receive data such as, e.g., a chapel encoder, an interleaver and a modulator (concerning transmit data) as well as a demodulator, an equaliser, a de-interleaver and a channel decoder (as concerns receive data). Further, in one embodiment the baseband module may contain a control unit configured to generate configuration macros, activation macros and to receive and process status/error macros.

The activation macros sent by the baseband module 20 are received by the interface unit 1 of the radio frequency module 100. Similar to the configuration macros, they are comprised in the oversell data that is received by the radio frequency/module 100 and indicated by the two arrows INPUT. By means of the channel ACTIVATION, the interface unit 1 transmits the received, activation macros to the third finite state machine 11 implemented in hardware and configured to process the activation macros. In a first step, the third finite state machine 11 decodes a received activation macro by reading the content of its operation code field. If the received activation macro is associated to a certain configuration macro, the third finite state machine 11 starts one unit of the first finite state machine 10a (reception mode) or 10b (transmission mode) that processes the associated configuration macro having the second format.

As already mentioned, the radio frequency module 100 comprises a second control bus system 12 coupling the interface unit 1 to the first finite state machine 10a, 10b, the first memory 8 and the transceiver unit 4a, 4b. Further components of the radio frequency module 100 may be coupled to the second control but system 13 as well depending on the desired functionality of the module 100. Due to the coupling of the interface unit 1 to the first memory 8, configuration macros received by the interface unit 1 and having the first format may directly be stored in the first memory 8 without undergoing a conversion by the microprocessor 5. Thus, configuration macros may be stored in the first memory 8 in both formats, which may particularly be helpful for control purposes.

Moreover, the radio frequency module 100 comprises a data bus 13 configured to transmit payload data between the interface unit 1 and the transceiver unit 4a, 4b. The payload data may further be transmitted between the interface unit 1 and the baseband module 20 coupled thereto (cf. arrows INPUT and OUTPUT). In the case of the radio frequency module 100, the interface unit 1 is configured to receive both activation and configuration macros and payload data. Note that embodiments having two separate interface units (one interface unit for (activation and configuration) macros and one interface unit for payload data) are feasible as well.

The fourth finite state machine 14 may be configured to process and/or forward status and/or error macros received from an arbitrary component of the radio frequency module 100 to the interface unit 1. The coupling between the fourth finite state machine 14 and the interface unit 1 is implemented by a channel STATUS/ERROR. In this manner, status and/or error macros are transmittable to the baseband module 20 coupled to the interface unit 1. Based on the transmitted status and/or error macros, the baseband module 20 or a control unit (e.g., a microprocessor) contained therein may optimize and adjust further instructions sent from the baseband module 20 to the radio frequency module 100. For example, due to a status and/or error macro containing information, about the transmission power of the transceiver unit 4a, 4b, the control unit (e.g., a processor) in the baseband module 20 is able to regulate the power for prospective transmissions.

Figure 2:
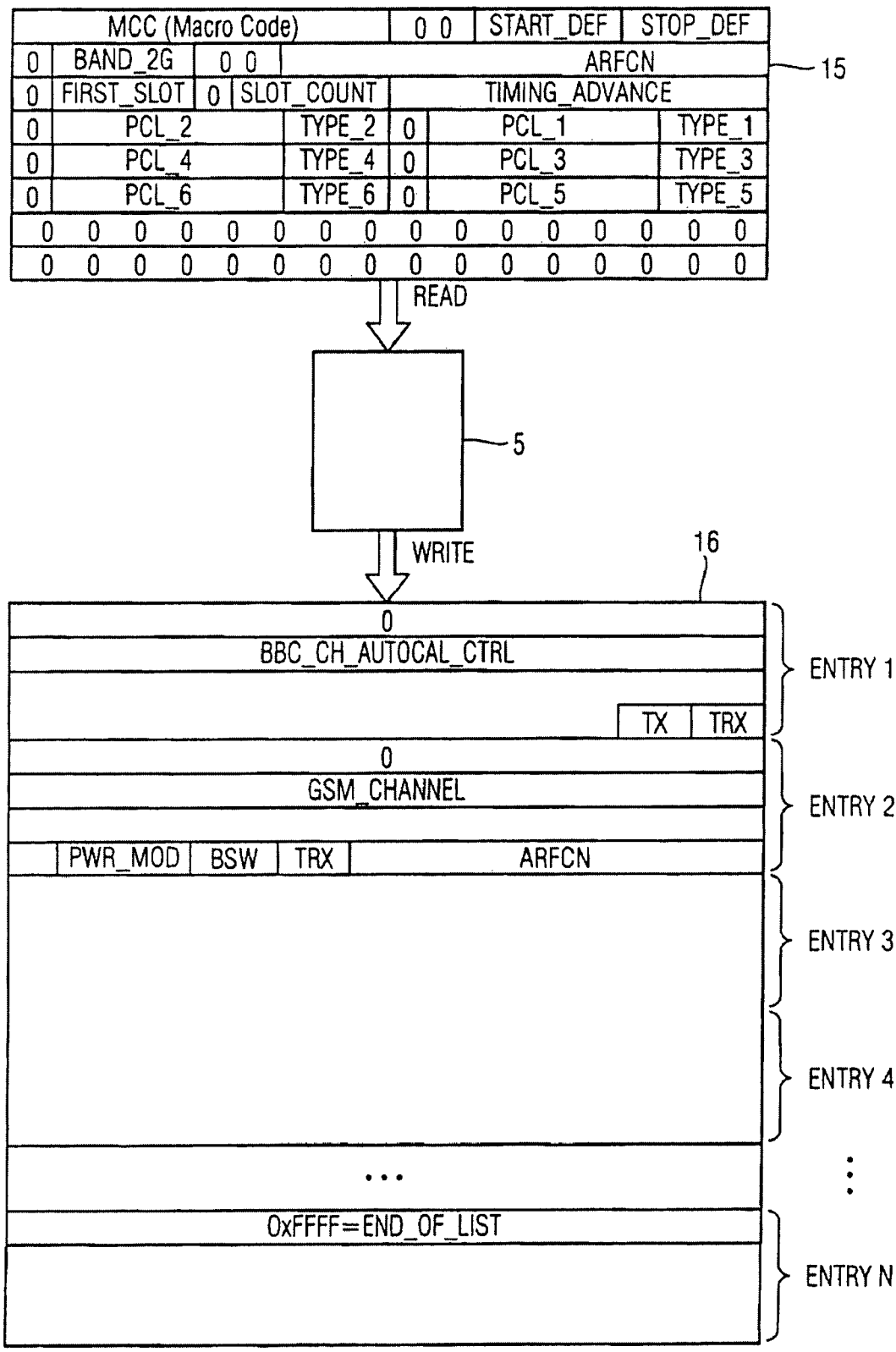
FIG. 2 schematically shows the conversion of a macro having a first format to a macro having a second format.

FIG. 2 schematically shows the conversion of a macro having a first format 15 to a macro having a second format 16. As already mentioned in the preceding paragraphs, the conversion is performed by the microprocessor 5 controlled by the software or firmware running on true microprocessor 5. In one embodiment, the software or firmware configured to process the macros may be implemented using a high-level programming language like the C language. The displayed macro having the first format 15 is exemplary and shows an embodiment taken from a conversion using the C language. The macro comprises several data fields, whose specific meaning and arrangement is exemplary and depends on the task to be accomplished. For example, the field labeled "MCC (Makro Code)" and located in the upper left part of the macro 15 represents the operation code field on whose basis the second finite state machine 3 decides, if the macro having the first format 15 is to be forwarded and processed by the microprocessor 5 or if it is to be processed by the second finite state machine 3.

In one embodiment the microprocessor 5 reads the macro having the first format 15 from the first memory 8 (cf. arrow READ) via the first control bus system 23. In a next step, the microprocessor 5 converts the macro having the first format 15 to a macro having the second format 16. During this conversion, the microprocessor 5 decodes the configuration macro 15 and performs the desired conversions and/or interpolations. The applied logic operations and algorithms on whose basis the conversions and interpolations are performed are determined and controlled by the software or firmware running on the microprocessor 5 which is adapted to control the operation of the radio frequency module 100.

In one embodiment, after its generation the macro having the second format 16 is stored in the first memory 8 (cf. arrow WRITE). The depicted macro having the second format 16 is exemplary and shows an embodiment taken from a conversion using the C language. It comprises a list of serial timed register write accesses built by the entries ENTRY 1 to ENTRY 3. The specific meaning and arrangement of the depicted entries, i.e. the variables therein, are exemplary, it is to be noted that the macro having the second format 16 may contain more information than the macro having the first format 15, wherein additional information may be generated, during the conversion by the microprocessor 5. Accordingly, the added information is determined by the employed software or firmware running on the microprocessor 5. More specifically, such added information introduced by the microprocessor 5 may be dependent on the specific system configuration of the radio frequency module 100 such as components of the receiving unit 4a and the transmitting unit 4b controlled by the first finite state machine units 10a and 10b, respectively. Further, the added information may be dependent on the hardware configuration of the finite state machine units 10a and 10b, i.e. of register addresses used in these programmable hardware machines.

In other words, in one embodiment the instructions contained in the macro having the second format 16 are hardware-level instructions which can be directly processed by finite state machines such as the first finite state machine 10. On the other hand, the instructions contained in the macro having the first format 15 are higher level than the instructions contained in the macros having the second format 16 and may be written in an appropriate scripting language known by the baseband module 20.

Figure 3:
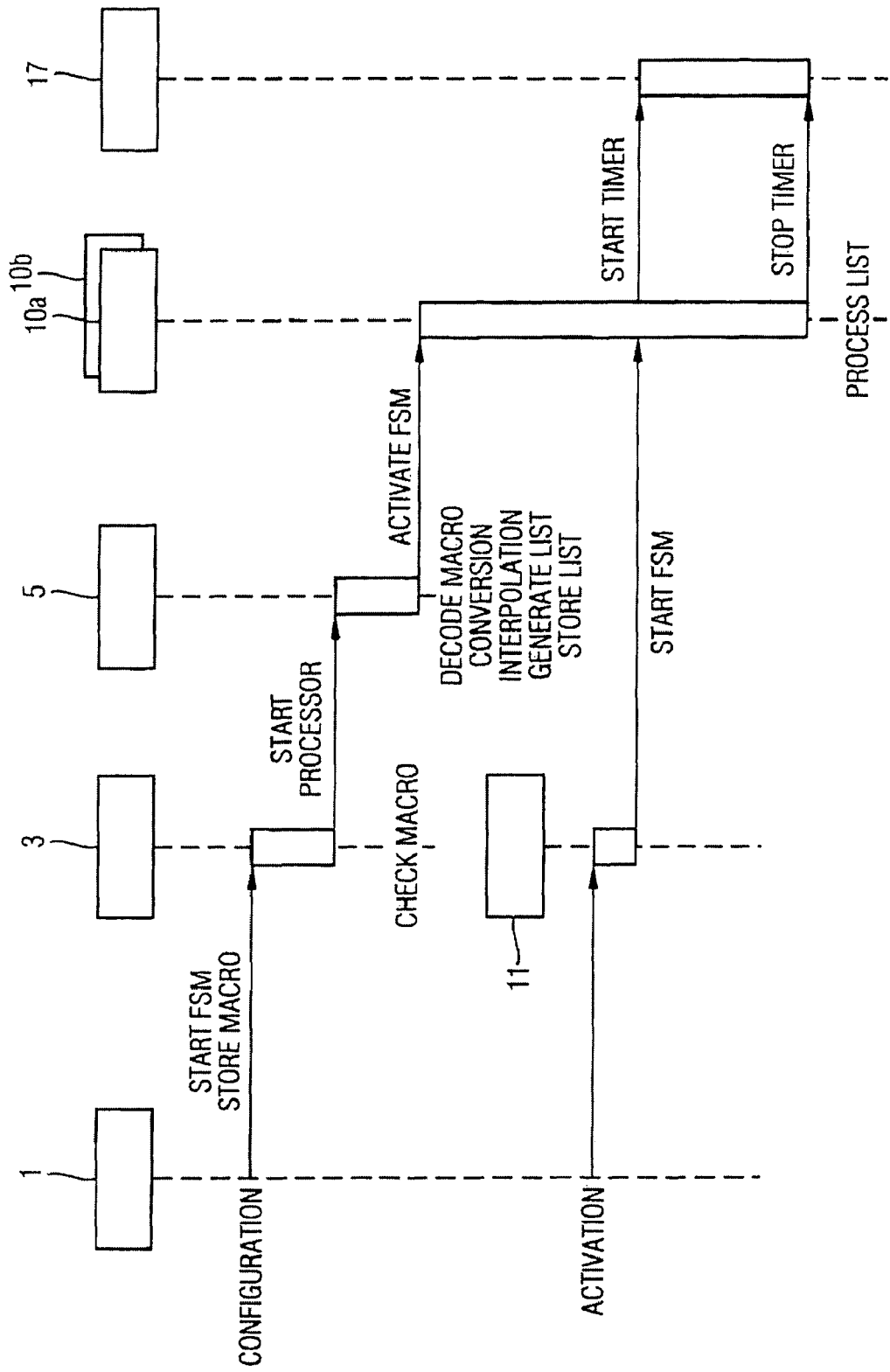
FIG. 3 schematically shows an activation of a configuration macro by an activation macro.

FIG. 3 schematically shows an activation of a configuration macro by an activation macro. The depicted boxes in the upper row represent components of the radio frequency module 100 involved in the activation process. Here, the involved components are the interface unit 1, the second finite state machine 3, the microprocessor (μP) 5, the first finite state machine 10a, 10b, the third finite state machine 11 and the timer (T) 17.

In one embodiment the process of FIG. 3 consists of two parallel process paths labeled CONFIGURATION and ACTIVATION. The upper process path CONFIGURATION depicts the processing of the configuration macro, while the lower process path ACTIVATION depicts the processing of the activation macros. The interface unit 1 receives a configuration macro having the first format from the input INPUT of the radio frequency module 100. The macro is stored in the first memory 8 (STORE MACRO) and the second finite state machine 3 is started (START FSM). The second finite state machine 3 now checks the configuration macro having the first format (CHECK MACRO) by reading the content of its operation code field. The content of the operation code field determines whether the macro saving the first format will be processed by the second finite state machine 3 or converted to a macro having the second format by the microprocessor 5. In the embodiment of FIG. 3, the macro having the first format is not processed by the second finite state machine 3, but converted by the microprocessor 5 to a macro having the second format.

After the microprocessor 5 is started (START PROCESSOR), it executes the process steps that were already explained in FIG. 2 and its description. These process steps are the decoding of the macro having the first format (DECODE MACRO), conversion (CONVERSION), interpolation (INTERPOLATION) and the generation of the macro having the second format (GENERATE LIST). After the list has been generated, it is stored in the first memory 8 and one of the components of the first finite state machines 10a or 10b is activated to be prepared for a processing of the converted macro having the second format.

The process steps described in this embodiment so far are independent from activation macros or a specific timing. The configuration macro having the second format and stored in the first memory 8 is not yet processed, by the first finite state machine 10a, 10b. For this purpose, the interface unit 1 receives an activation macro ACTIVATION and sends it to the third finite state machine 11. The activation macro comprises information on when a configuration macro is to be processed by the first finite state machine 10a, 10b. Accordingly, the third finite state machine 11 reads said information and starts (START FSM) one unit of the first finite state machine 10a (receiving mode) or 10b (transmission mode).

In a next step, the first finite state machine 10a, 10b processes the macro having the second format in such a way as it has already been described in the preceding paragraphs. At the start of the processing, the timer 17 is started that may for example be implemented in the first finite state machine 10a, 10b. The timer 17 times the processing of the macro having the second format in accordance with the time value field contained in the macro having the second format and is stopped when the macro having the second format is completely processed by the first finite state machine 10a, 10b.

Figure 4:
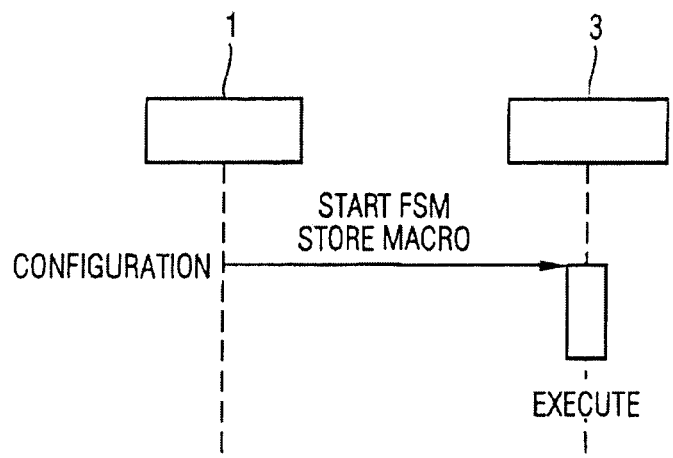
FIG. 4 schematically shows the processing of a configuration macro.

FIG. 4 schematically shows the processing of a configuration macro by the second finite state machine 3. In contrast to FIG. 3, the process of FIG. 4 merely comprises one process path labeled CONFIGURATION. The interface unit 1 receives a configuration macro having the first format, which is stored in the first memory 8 (STORE MACRO). The second finite state machine 3 is started (START FSM), and the macro having the first format is directly processed by the second finite state machine 3 (EXECUTE). The illustrated process does not comprise a conversion between data formats performed by the microprocessor 5 or an employment of activation macros.

Figure 5:
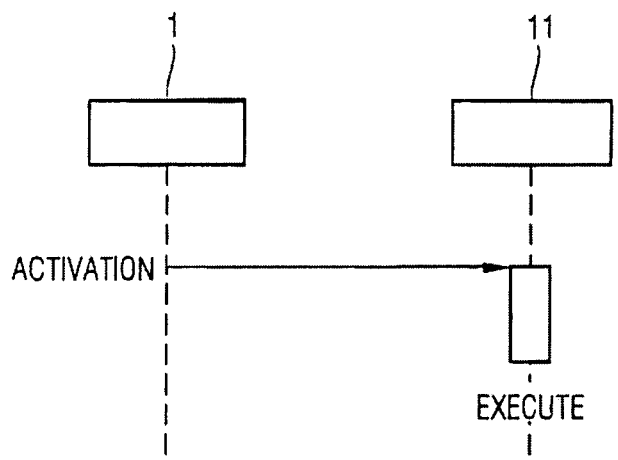
FIG. 5 schematically shows the processing of an activation macro.

FIG. 5 schematically shows the processing of an activation macro according to one embodiment. Similar to FIG. 4, the process of FIG. 5 merely shears one process path labeled ACTIVATION. The interface unit 1 receives an activation macro, which is sent to the third finite state machine 11. Depending on the timing information comprised, in the activation macro, the third finite state machine 11 starts the process associated with the activation macro at the correct time. The illustrated process does not comprise an employment of configuration macros. An example for a process merely employing activation macros is a synchronization, process between the baseband module 20 and the radio frequency module 100.

Figure 6:
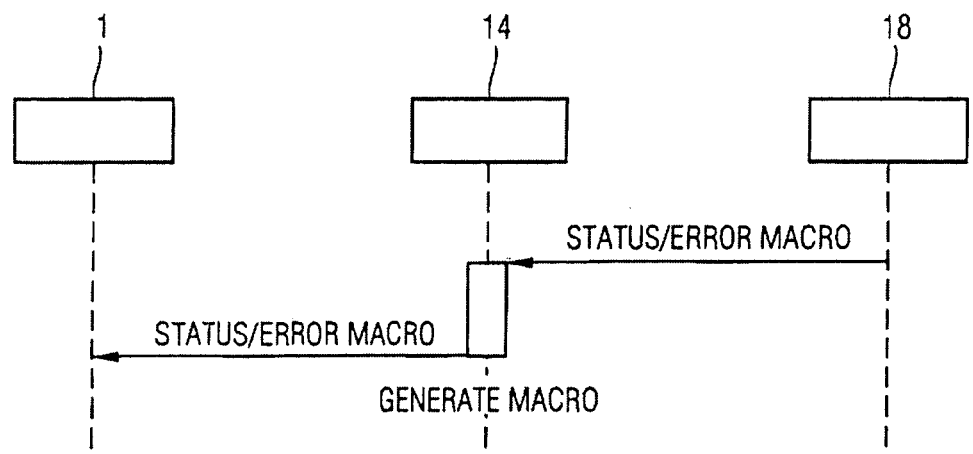
FIG. 6 schematically shows the processing of a status and/or error macro.

FIG. 6 schematically shows the processing of a status and/or error macro. On arbitrary component 18 of the radio frequency module 100 such as, e.g., one of the finite stare machines 3, 10a, 10b, 11, the units 4a, 4b or the microprocessor 5 sends status and/or error information to the fourth, finite state machine 14. In order to generate a status and/or error macro having a desired format, the fourth finite state machine 14 generates a formatted macro and sends it to the interface unit 1. It is so be named that the formal of the status anchor error macro is not necessarily identical no one of the two formats described so far. From the interface unit 1, the status and/or error macro may be sent, to a baseband module coupled to the interface unit 1. In this manner, a microprocessor comprised in the baseband module may optimise and august further instructions that are to be sent to the radio frequency module.

The status and/or error macros may be distinguished in two different types. Macros of the first type are status and/or error macros requested by configuration macros. In this case, the related configuration macros comprise information determining which status and/or error information is to be transmitted to the interface unit 1. Macros of the second type are status and/or error macros not requested by configuration macros. Accordingly, macros of the second type are transmitted to the interface unit 1 independent of requests of the baseband module.

Although the invention has been illustrated ace described with respect to one or more implementations, alterations and/or modifications may be made to the illustrated examples without departing from the spirit and scope of the appended claims. In particular regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention. In addition, while a particular feature of the invention may have been disclosed with respect to only one of several implementations, such feature may be combined, with one or more other features of the other implementations as may be desired and advantageous for any given or particular application. Furthermore, to the extent that the terms "including", "includes", "having", "has", "with", or variants thereof are used in either the detailed description and the claims, such terms are intended to be inclusive in a manner similar to the term "comprising".

What is claimed is:

1. A radio frequency module, comprising:
   an interface unit configured to receive macros having a first format at an input of the radio frequency module, wherein the interface unit couples the radio frequency module to a baseband module;
   a microprocessor coupled to the interface unit and operable to convert the macros having the first format to macros having a second format;
   a first memory coupled to the microprocessor and operable to store the macros having the second format provided by the microprocessor; and
   a first finite state machine configured to process the macros having the second format accessed from the first memory.

2. The module of claim 1, further comprising a transceiver unit, wherein the macros having the first and the second format are configuration macros operable to configure operations performed by components of the transceiver unit.

3. The module of claim 2, further comprising a control bus system coupling the interface unit to the first finite state machine, the first memory and the transceiver unit.

4. The module of claim 2, further comprising a data bus configured to transmit payload data between the interface unit and the transceiver unit.

5. The module of claim 1, wherein one or more of the macros having the second format comprises a register address field, a data value field, and a time value field.

6. The module of claim 1, wherein one or more of the macros having the second format comprises a list of serial timed register write accesses.

7. The module of claim 1, further comprising:
   a second finite state machine coupled to the interface unit, wherein the second finite state machine is configured to process the macros having the first format.

8. The module of claim 7, wherein the second finite state machine is configured to decide if macros having the first format received from the interface unit are to be forwarded to the microprocessor or to be processed by the second finite state machine.

9. The module of claim 8, wherein the one or more of the macros having the first format comprises an operation code field, a state of which facilitates determining the decision of the second state machine.

10. The module of claim 1, wherein the interface unit is further configured to receive activation macros to activate a processing of macros having the first or the second format.

11. The module of claim 10, further comprising a third finite state machine coupled to the interface unit, wherein the third finite state machine is configured to process the activation macros.

12. The module of claim 1, further comprising a fourth finite state machine coupled to the interface unit, wherein the fourth finite state machine is configured to process and/or forward status and/or error macros received from components of the radio frequency module to the interface unit.

13. The module of claim 1, wherein one or more of the states machines are implemented in hardware.

14. A method comprising:
   receiving macros having a first format at an input of an interface unit that couples a radio frequency module to a baseband module;
   converting macros having the first format to macros having a second format using a microprocessor;
   storing macros having the second format in a memory; and
   accessing and processing the stored macros having the second format using a first finite state machine implemented in hardware.

15. The method of claim 14, wherein the macros having the first and the second format comprise configuration macros operable to configure operations performed by components of a transceiver unit.

16. The method of claim 14, wherein one or more of the macros having the second format comprises a register address field, a data value field and a time value field.

17. The method of claim 14, further comprising:
   deciding if the received macros having the first format are processed or converted to macros having the second format, wherein the decision is performed by a second finite state machine.

18. The method of claim 14, further comprising:
   processing activation macros using a third finite state machine to activate the processing of macros having the first or the second format.

19. The method of claim 14, further comprising:
   processing and/or forwarding status and/or error macros using a fourth finite state machine.

20. The method of claim 14, further comprising:
   storing software utilized for the conversion of macros having the first format to macros having the second format.

21. The method of claim 14, further comprising:
   receiving payload data at an input of the radio frequency module.

22. The method of claim 14, wherein the processing of the macros having the second format is timed.

23. The method of claim 14, wherein the digital data received by the input of the radio frequency module is of serial and/or differential form.

24. A radio frequency module comprising:
   an interface unit configured to receive macros having a first format at an input of the radio frequency module, wherein the interface unit couples the radio frequency module to a baseband module;
   a first hardware-implemented finite state machine configured to receive the macros having the first format and to decide if the received macros are forwarded or processed by the first finite state machine;
   a microprocessor coupled to the first finite state machine and configured to convert macros having the first format to macros having a second format;
   a second hardware-implemented finite state machine coupled to the microprocessor and operable to process macros having the second format.

25. A method comprising:
receiving macros having a first format at an input of an interface unit that couples a radio frequency module to a baseband module;
deciding if the received macros are forwarded or processed by means of a first hardware-implemented finite state machine;
converting forwarded macros to macros having a second format by means of a microprocessor; and
processing the macros having the second format using a second hardware-implemented finite state machine.

* * * * *